United States Patent
Galai et al.

(10) Patent No.: US 10,354,274 B2
(45) Date of Patent: Jul. 16, 2019

(54) SYSTEM AND METHOD FOR PROVIDING FEED-BASED ADVERTISEMENTS

(71) Applicant: Outbrain Inc., New York, NY (US)

(72) Inventors: Yaron Galai, New York, NY (US); David Sasson, Pelham, NY (US); Itai Hochman, Beit Halevi (IL); Amit Elisha, Nes Ziona (IL)

(73) Assignee: OUTBRAIN INC., New York, NY (US)

(*) Notice: Subject to any disclaimer, the term of this patent is extended or adjusted under 35 U.S.C. 154(b) by 434 days.

(21) Appl. No.: 13/676,471

(22) Filed: Nov. 14, 2012

(65) Prior Publication Data

US 2013/0132191 A1 May 23, 2013

Related U.S. Application Data

(60) Provisional application No. 61/561,285, filed on Nov. 18, 2011.

(51) Int. Cl.
*G06Q 30/00* (2012.01)
*G06Q 30/02* (2012.01)

(52) U.S. Cl.
CPC .............. *G06Q 30/0251* (2013.01)

(58) Field of Classification Search
CPC .............. G06Q 30/02; G06Q 30/0241; G06Q 30/0277; G06Q 30/00; G06Q 30/0251; G06Q 30/0269; G06Q 30/0276
USPC ........... 705/14.4, 14.49, 14.53, 14.66, 14.73, 705/14.72, 26.7
See application file for complete search history.

(56) References Cited

U.S. PATENT DOCUMENTS

| | | | | |
|---|---|---|---|---|
| 6,311,211 | B1* | 10/2001 | Shaw et al. | 709/206 |
| 7,499,931 | B2* | 3/2009 | Fernandes | G06F 17/30938 |
| 7,693,830 | B2* | 4/2010 | Guha | G06F 17/30672 |
| | | | | 707/999.003 |
| 8,001,005 | B2* | 8/2011 | Pitkow | G06Q 30/02 |
| | | | | 705/14.73 |
| 8,392,246 | B2* | 3/2013 | Coladonato | G06Q 30/02 |
| | | | | 705/14.26 |
| 8,676,900 | B2* | 3/2014 | Yruski | G06Q 30/02 |
| | | | | 705/14.1 |
| 2006/0248209 | A1* | 11/2006 | Chiu | G06Q 30/02 |
| | | | | 709/231 |
| 2007/0157252 | A1* | 7/2007 | Perez | 725/61 |
| 2008/0195664 | A1* | 8/2008 | Maharajh et al. | 707/104.1 |
| 2008/0275763 | A1* | 11/2008 | Tran et al. | 705/10 |
| 2009/0254635 | A1* | 10/2009 | Lunt | 709/219 |

(Continued)

OTHER PUBLICATIONS

Microsoft Computer Dictionary, Fifth Edition, 2002, Microsoft Press, p. 23.*

(Continued)

*Primary Examiner* — Matthew T Sittner
*Assistant Examiner* — Michael I Ezewoko
(74) *Attorney, Agent, or Firm* — Lowenstein Sandler LLP

(57) ABSTRACT

A server computer receives data indicating a data feed to use to create a feed-based advertisement to represent content, which is to be advertised, of a content provider. The server computer receives the data feed that is associated with the content to be advertised and generates the feed-based advertisement using one or more data elements associated with an item in the data feed. The server computer provides the feed-based advertisement to a user device.

11 Claims, 5 Drawing Sheets

(56) References Cited

U.S. PATENT DOCUMENTS

| | | | | |
|---|---|---|---|---|
| 2010/0005001 | A1* | 1/2010 | Aizen | G06Q 30/0244 705/14.73 |
| 2010/0017280 | A1* | 1/2010 | Davis et al. | 705/14.4 |
| 2010/0306049 | A1* | 12/2010 | Kakade et al. | 705/14.49 |
| 2010/0332323 | A1* | 12/2010 | Kadambi et al. | 705/14.49 |
| 2011/0125560 | A1* | 5/2011 | Cocheu et al. | 705/14.4 |
| 2011/0184809 | A1* | 7/2011 | Beavers | G06Q 30/02 705/14.64 |
| 2012/0059713 | A1* | 3/2012 | Galas | G06Q 30/0244 705/14.49 |
| 2014/0143047 | A1* | 5/2014 | Carter et al. | 705/14.49 |

OTHER PUBLICATIONS

Mind—A Brief Introduction, John R. Searle, 2004, Oxford University Press, pp. 62-67.*
What is Thought, Eric Baum, The MIT Press, 2004, pp. 33-65.*
Robotics, Science and Systems III, Wolfram Burgard, Oliver Brock, and Cyrill Stachniss, The MIT Press, 2008, pp. 41-48.*
Noetics, Lawrence Krader, 2010, Peter Lang Publishing, pp. 551-553.*
Britannica Concise Encyclopedia, Encyclopedia Britannica, 2006, p. 537.*
Content Syndication with RSS; Hammereley, O'Reilly, 2003, including pp. 1-142.*
RSS and Atom Programming, Ayers and Watt, Wiley Publishing, 2005, including chapter(s) 1-24 [emphasis chapter(s) 3-15].*
HCI remixed : reflections on works that have influenced the HCI community, MIT Press, 2008: pp. 275-279.*
Why a Diagram is (Sometimes) Worth Ten Thousand Words, Larkin, Simon, Cognitive Science, 1987, pp. 65-100.*
Streetlights and Shadows, MIT Press, 2009, pp. 33-47.*
The future of the internet—and how to stop It, Yale University Press, 2008, Chapter(s) 1-9, [emphasis pp. 11-18].*
The Semantic Web, Bussler, Springer-Verlag, 2004, pp. 152-166 [emphasis pp. 152-153].*
PCT Notification of Transmittal of the International Search Report and the Written Opinion of the International Searching Authority, or the Declaration, PCT International Search Report, PCT Written Opinion of the International Searching Authority for International Application No. PCT/US2012/065711, dated Feb. 6, 2013, 11 pages.
PCT Notification of Transmittal of the International Search Report and the Written Opinion of the International Searching Authority, or the Declaration; PCT International Search Report; PCT Written Opinion of the International Searching Authority, dated Feb. 6, 2013, 11 pages.

\* cited by examiner

SYSTEM AND METHOD FOR PROVIDING FEED-BASED ADVERTISEMENTS

RELATED APPLICATIONS

This application is related to and claims priority to U.S. Provisional Patent Application No. 61/561,285 filed on Nov. 18, 2011, titled SYSTEM AND METHOD FOR CREATING RSS-BASED ADVERTISEMENTS, the entire disclosure of which is incorporated herein by reference.

TECHNICAL FIELD

Implementations of the present disclosure relate to advertisements and, more particularly, to a technique of providing feed-based advertisements.

BACKGROUND OF THE INVENTION

Conventional methods of online advertising involve the serving of advertisements to users upon the users visiting a particular publisher webpage. The style and format of advertisements vary widely from sponsored link advertisement units to display advertisements such as banners and pop-ups. The ad contents also vary widely depending on the particular advertiser, audience segment and the product or services being advertised.

Despite the far reach of Internet advertising, online content providers oftentimes have difficulty effectively advertising the content they offer (e.g., articles, blogs) in real time to drive traffic to their websites. This is particularly true for content providers whose websites are constantly being updated with new content. Traditional online advertising techniques are generally not well-suited to such content publishers, which have content that is continuously being updated.

BRIEF DESCRIPTION OF THE DRAWINGS

The present disclosure will be understood more fully from the detailed description given below and from the accompanying drawings of various implementations of the disclosure.

DETAILED DESCRIPTION OF THE PRESENT INVENTION

Methods and systems for providing digital advertisements, including feed-based advertisements, are described. An advertisement hereinafter refers to a representation of digital content. In one implementation, a server computer receives data indicating a data feed that can be used for creating a feed-based advertisement. The server computer receives the data feed that is associated with the content to be advertised and generates the feed-based advertisement using one or more data elements that are associated with an item in the data feed. The server computer provides the feed-based advertisement to a user device.

Implementations provide an efficient and automated mechanism to generate feed-based advertisements for content that is frequently changing. Implementations reduce the time to create the advertisements and more accurately represent content that is being advertised by using data feeds.

Figure 1:
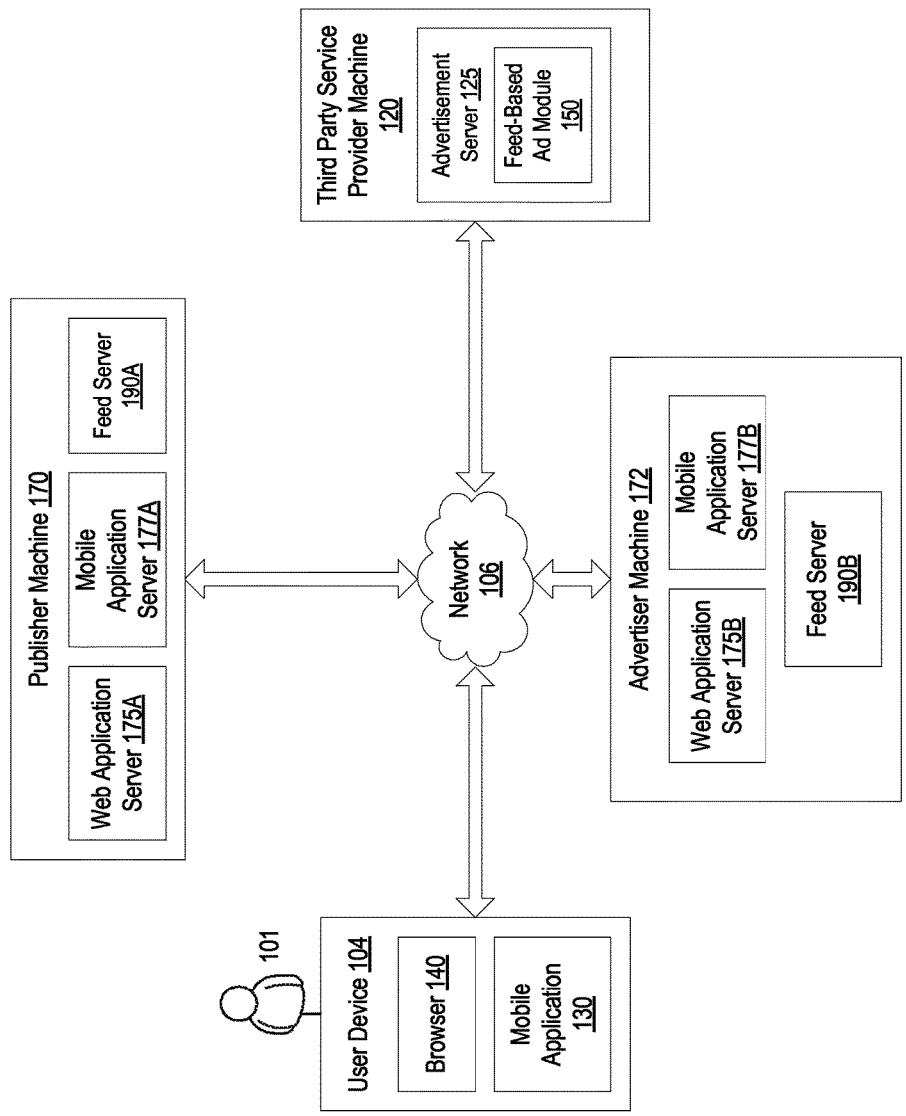
FIG. 1 is a block diagram of an example system architecture, in which implementations described herein may operate.

FIG. 1 is a block diagram of example system architecture 100, in which implementations described herein may operate. The system architecture 100 may include one or more third party service provider machines 120, one or more publisher machines 170, one or more advertiser machines 172, and one or more user devices 104 connected via a network 106. Network 106 may be a public network such as the Internet or private a network such as a local area network (LAN) or wide area network (WAN). Network 106 can include a wireless infrastructure. The wireless infrastructure may be provided by one or multiple wireless communications systems, such as a wireless fidelity (WiFi) hotspot connected with the network 106 and/or a wireless carrier system that can be implemented using various data processing equipment, communication towers, etc. Alternatively, or in addition, the wireless carrier system may rely on satellite technology to exchange information with the user device 104.

The user device 104 may be a portable computing device such as, and not limited to, mobile telephones, personal digital assistants (PDAs), portable media players, netbooks, laptop computers, an electronic book reader and the like. The user device 104 may also be other types of computing devices such as a desktop computer, a set-top box, a gaming console, a television, etc. that may not traditionally be considered to be portable.

A publisher, hereinafter, refers to an entity that presents digital content to user devices 104. An entity, as referred to herein, can represent any person, a business organization such as a corporation, an educational institution such as a college and university, etc. A publisher can provide digital content, which may result in a large number of user 101 accesses (e.g., webpage views, mobile application downloads mobile application views, etc.). Examples of a publisher can include, and are not limited to, a news publisher, a magazine publisher, a blog publisher, and any type of media publisher. Examples of high traffic can include, and are not limited to, a significant number of users 101 that access the digital content, a significant number of accesses by a moderate number of users 101, and/or any combination of the amount of users 101 and access, relative to a threshold. The publisher machines 170 can host one or more web application servers 175A and/or one or more mobile application servers 177A to provide digital content to user devices 104, for example, via mobile applications 130 downloaded to user devices 104, and/or websites accessed via a browser 140. A publisher machine 170 can include, and is not limited to, any data processing device, such as a desktop computer, a laptop computer, a mainframe computer, a personal digital assistant, a server, a handheld device or any other device configured to process data. For example, a publisher, such as Sports News Journal, may provide a sports news website (e.g., www.sportsnewsjournal.com) hosted by a web application server 175A on one or more publisher machines 170 and can be accessed by users 101 via a browser 140 on user devices 104. In another example, the publisher machine 170 may provide a Sports News Journal mobile phone application, which can be downloaded to user devices 104.

An advertiser, hereinafter, refers to an entity that has digital content to be advertised. Examples of advertisers can include, and are not limited to, public relations firms, publishers, brand firms, or any other entity that has digital content to advertise, such as and not limited to, articles, blog posts, videos, product reviews, press, etc.

The digital content of the advertiser can be hosted on one or more advertiser machines 172. An advertiser machine 172 can include, and is not limited to, any data processing device, such as a desktop computer, a laptop computer, a mainframe computer, a personal digital assistant, a server, a handheld device or any other device configured to process data. The advertiser machine 172 can host one or more web application servers 175B and/or one or more mobile application servers 177B to provide digital content (e.g., articles, blogs, text, videos, audio, images, etc.), for example, via websites accessed via a browser 140 on a user device 104, and/or mobile applications 130 downloaded to user devices 104.

For example, an advertiser, Golfing Magazine, Inc., may provide online articles pertaining to golf. Golfing Magazine, Inc. may use the web application server 175B to host the website www.golfingmagazine.com and/or may use the mobile application server 177B to provide a mobile application 130 (e.g., Golfing Magazine mobile application) to a user device 104. The website www.golfingmagazine.com and/or Golfing Magazine mobile application may include an article that discusses an upcoming golf tournament, an article that describes the newest golf technology, etc.

Golfing Magazine, Inc., may wish to promote content (e.g., articles, blogs, images, etc.) relating to golf and may wish to drive user traffic to the golf-related content, for example, on www.golfingmagazine.com and/or the Golfing Magazine mobile application. The advertiser can subscribe to an advertisement service provided by a third party service provider. A third party can be an entity which may not be a publisher or an advertiser. The third party service provider can provide an advertisement service via one or more third party service provider machines 120. The third party service provider machines 120 can include, and are not limited to, any data processing device, such as a desktop computer, a laptop computer, a mainframe computer, a personal digital assistant, a server, a handheld device or any other device configured to process data.

The third party service provider machines 120 can host an advertisement server 125, which is a network-accessible server-based functionality. The advertisement server 125 can include a feed-based advertisement module 150 to create advertisements, including feed-based advertisements, for the advertiser content (e.g., Golfing Magazine, Inc. articles) and can distribute the advertisements using one or more publisher distribution channels. Examples of a distribution channel, can include, and are not limited to, the feed-based advertisement module 150 presenting the advertisements in user devices 104, for example, via publisher mobile applications 130 downloaded to the user devices 104, publisher websites accessed through browsers 140, publisher web TV (web television, Internet television) accessed via browser 140 or mobile applications, publisher messages sent to the user devices 104, and/or publisher newsletters delivered via messages to the user devices 104. Examples of a message can include, and are not limited to, email mail messages, SMS (short message service) text messages, MMS (multimedia messaging service) messages, instant messages, social networking messages, etc.

A feed-based advertisement is a digital representation of digital content that is created using a data feed. An advertiser can subscribe to the advertisement service provided by the feed-based advertisement module 150 and can specify which data feed(s) the feed-based advertisement module 150 should use to create the feed-based advertisements. In one implementation, a subscription involves a payment. A subscriber hereinafter refers to an entity that subscribes to the advertisement service provided by the third party service provider machine 120. Examples of subscribers can include, and are limited to, an advertiser, a publisher, etc.

A data feed is a mechanism to receive data (e.g., digital content) from data sources (e.g., advertiser machine 172, publisher machines 170). Examples of digital content can include, and are not limited to, articles, blogs, text, videos, audio, images, etc. A data feed is a data format that allows online content providers to syndicate content to subscribers of the feeds. Online content providers (e.g., advertisers, publishers, etc.) can provide up-to-date information of content they offer to data feed subscribers, which enable quick access to new or changed content.

An example of a data feed can include, and is not limited to, a web feed. Examples of web feed protocols can include, and are not limited to, RSS (Really Simple Syndication), Atom, XML (Extensible Markup Language), JSON (JavaScript Object Notation). The RSS protocol and Atom protocol use a standardized XML (extensible markup language) file format that is capable of being viewed by many different programs. The RSS specification defines standard fields or elements which may be read by RSS readers.

The advertiser machine 172 can host one or more feed servers 190B to provide data feeds for digital content that is to be advertised. For example, the advertiser Golfing Magazine, Inc. may have a data feed for the website www.golfingmagazine.com, which may be "http://www.golfingmagazine.com/rss.xml" and may be provided by feed server 190B. A publisher machine 170 can also host one or more feed servers 190A to provide data feeds for digital content that is to be advertised. A publisher may also be an advertiser. The feed servers 190A,B can provide any number of data feeds corresponding to various sections of a website. For example, the feed server 190b may provide a data feed for a news section of www.golfingmagazine.com, a data feed for an instruction section of www.golfingmagazine.com, a data feed for an equipment section of wwwgolfingmagazine.com, etc. The advertiser machine 172 and publisher machine 170 may include a network-accessible server-based functionality (e.g., feed server 190A,B, web application server 175A,B, mobile application server 177A,B), various data stores, and/or other data processing equipment.

The third party service provider can pre-determine which publishers and/or publisher machines 170 to use for a distribution channel for the advertisements (e.g., feed-based advertisements, non-feed-based advertisements). The third party service provider may use criteria to identify which publishers to use. Examples of the criteria can include, and are not limited to, a threshold for a number of website hits, a threshold a number of mobile application downloads, a threshold for a number of publisher subscriptions, a threshold for revenue generated from the digital content, branding, etc.

Figure 2:
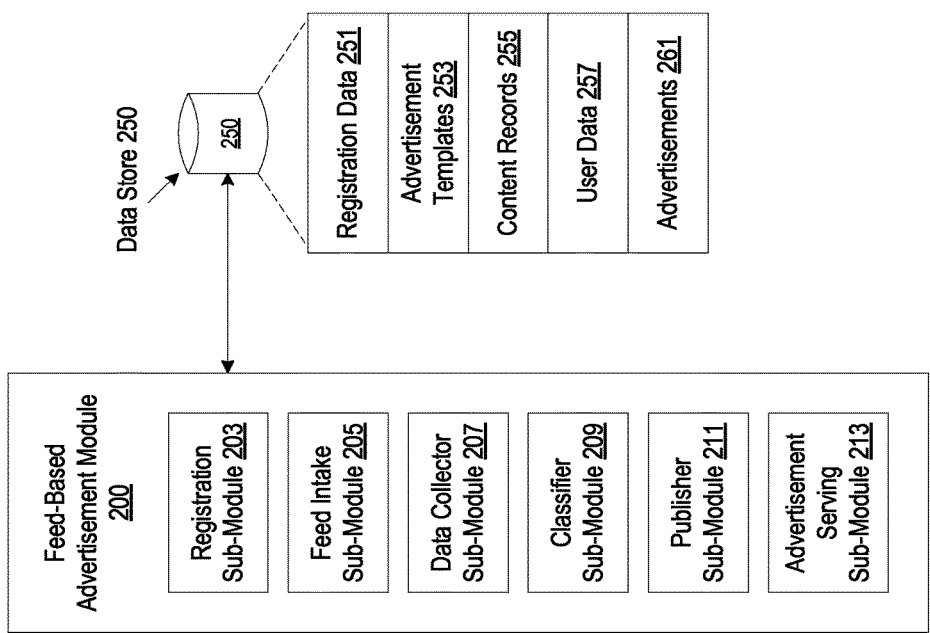
FIG. 2 is a block diagram of one implementation of a feed-based advertisement module.

For example, the third party service provider may select the publisher Sports News Journal as a distribution channel for the advertisements. The advertiser Golfing Magazine, Inc. may subscribe to the third party advertisement service and may specify to the feed-based advertisement module 150 that the data feed "http://www.golfingmagazine.com/rss.xml" should be used to create feed-based advertisements for Golfing Magazine, Inc. articles. The feed-based advertisement module 150 can create an advertisement for the Golfing Magazine, Inc. article discussing an upcoming golf tournament or the latest golf technology using the data feed "http://www.golfingmagazine.com/rss.xml" and can present the advertisement on a webpage on the publisher website www.sportsnewsjournal.com in the browser 140 on the user device 104, in a publisher mobile application 130 (e.g., Sports News Journal mobile application) on the user device 104, in a Sports News Journal Newsletter delivered to the user device 104, for example, via email, SMS, MMS, social media message, etc. FIG. 2 is a block diagram of one implementation of a feed-based advertisement module 200, which may correspond to feed-based advertisement module 150 of FIG. 1. In one implementation, the feed-based advertisement module 200 includes a registration sub-module 203, a feed intake sub-module 205, a data collector sub-module 207, a classifier sub-module 209, a publisher sub-module 211, and an advertisement serving sub-module 213. In alternative implementations, one or more of these sub-modules may be combined into a single sub-module. Additionally, the functionality of any of these sub-modules may be separated into multiple distinct sub-modules.

The registration sub-module 203 can receive input of registration data from entities (e.g., advertisers) subscribing to the feed-based advertisement service and one or more publishers acting as distribution channels for advertisements. The registration data 251 can be stored in a data store 250 that is coupled to the registration sub-module 203. For subscribers, the registration data 251 can include, for example, and not limited to, a subscriber identifier, one or more feed identifiers (e.g., uniform resource locators (URLs)), a location of the source data (e.g., web page) associated with a feed, keywords associated with the subscriber, subscriber preferences, etc. For publishers, the registration data 251 can include, for example, and not limited to, a publisher identifier, data for creating advertisement templates 253 for the publisher, publisher formats (e.g., websites, mobile applications, messages, etc.), etc. The registration sub-module 203 can store registration data 251 for any number of subscribers.

A data store 250 can be a persistent storage unit. A persistent storage unit can be a local storage unit or a remote storage unit. Persistent storage units can be a magnetic storage unit, optical storage unit, solid state storage unit, electronic storage units (main memory), or similar storage unit. Persistent storage units can be a monolithic device or a distributed set of devices. A 'set', as used herein, refers to any positive whole number of items.

The feed intake sub-module 205 can establish communication with any number of feed servers (e.g., feed servers 190A,B in FIG. 1) to receive the data feeds. For example, the feed intake sub-module 205 can subscribe to the data feeds. The feed intake sub-module 205 can include a feed aggregator to receive the feeds from any number of feed servers. In one implementation, the feed intake sub-module 205 stores the data feeds in the data store 250.

A data feed can contain any number of items. An "item" or "feed item" refers to an individual entry within the feed and may represent a text-based article, an image, a video or any other content supported by the particular feed. An item in a data feed can include a number of elements. Examples of elements of a data feed item can include, and are not limited to, a title element, a link element describing a location (e.g., URL) of the data feed item, a description element, a body text element, URL, a keywords element, a media (e.g., image, audio, video) file element, a publish date element, an author element, a category element, a comments element, an identifier element, a source element, etc.

The data collector sub-module 207 can collect data for the elements for each item in the data feed and can generate a content record 255 for each item. The content record 255 can include the data for the elements (e.g., title, link, description, etc.). Any number of content records 255 for any number of items in any number of data feeds can be stored in the data store 250. Examples of a content record 255 can include, and are not limited to, a record in a file system, a record in a database, a text file, a database entry, etc.

If a particular data element (e.g., body text) is not included in a data feed, the data collector sub-module 207 can collect data for the particular data element from the source (e.g., web page) of the content that is associated with the item. The data collector sub-module 207 can retrieve data for an element from a source using a web crawler and/or web spider capable of scraping content from, for example, a URL. One implementation of collecting data for the feed-based advertisement using the data feed is described in greater detail below in conjunction with FIG. 3.

The classifier sub-module 209 can associate one or more categories, one or more keywords, etc. with each content record 255. For example, the classifier sub-module 209 may classify a content record 255 for Golfing Magazine, Inc. with categories and keywords, such as, sports, golf, course, champion, and tournament. The classifier sub-module 209 can use machine learning and/or a classification model to classify the content record.

The publisher sub-module 211 can create one or more advertisement templates 253 for each publisher using the publisher registration data 251 and store the templates 253 in the data store 250. The publisher sub-module 211 can associate the advertisement templates 253 with one or more distribution channels (e.g., publisher websites, publisher mobile applications, publisher newsletters, etc.) based on the publisher registration data 251. An advertisement template 253 can indicate which one or more data elements in a content record 255 should be used to create a feed-based advertisement. For example, an advertisement template 253 for a website for Publisher-A may include a link (e.g., URL) element. In another example, an advertisement template 253 for a website for Publisher-A may include a link (e.g., URL) element and a title element. In another example, an advertisement template 253 for a website for Publisher-B may include a link (e.g., URL) element and the media (e.g., image) element. In other implementations, an advertisement template 2537 includes any combination of the data elements in one or more content records 255.

In one implementation, an advertisement template 253 is sent to a publisher server (e.g., web application server 175A and/or mobile application server 177A in FIG. 1) as part of instruction data and the publisher server can include the instruction data and the advertisement template 253 in a publisher web page and/or in a publisher mobile application to cause a browser and/or mobile application on a user device to request an advertisement (e.g., feed-based advertisement, non-feed-based advertisement) from the feed-based advertisement module 200. In another implementation, an advertisement template 253 is stored in the data store 250.

The advertisement serving sub-module 213 can receive a request to create an advertisement and can determine which advertisement to generate for the request. The request can be for a feed-based advertisement. The request can be received from a browser and/or a mobile application on a user device. The advertisement serving sub-module 213 can use data in the request to identify which advertisement template 253 to populate to generate the advertisement. For example, the data in the request may indicate that the request is for a website (www.sportsnewjournal.com) for Sports News Journal and the advertisement serving sub-module 213 may identify that a particular advertisement template 253 which is for a website for Sports News Journal should be used to create the advertisement.

The advertisement serving sub-module 213 can use a mapping algorithm, data in the request, advertisement template 253 that should be populated, and user data 257 to determine which one or more content records 255 should be used to populate an advertisement template 253 to generate a feed-based advertisement. The user data 257 can include, for example, and not limited to, user provided data (e.g., gender, age, interests, and preferences), user browsing history, user application usage data, user geographic location, etc. For example, the mapping algorithm may use data in the request and user data 257 to determine that one or more content records 255 for Golfing Magazine, Inc. should be used to populate the Sports News Journal advertisement template. In one implementation, a user device (e.g., user device 104 in FIG. 1) notifies users (e.g., user 101 in FIG. 1) of the types of information that are stored in the respective logs and data stores and/or transmitted to a server (e.g., advertisement server 125 in FIG. 1), and provides the user the opportunity to opt-out of having such information collected and/or shared with the server.

In one implementation, the advertisement serving sub-module 213 populates the advertisement template 253 that is stored in the data store 250 using the data for the elements in the identified one or more content records 255 to generate a feed-based advertisement. In one implementation, the feed-based advertisement 261 may be stored in the data store 250. In another implementation, the advertisement serving sub-module 213 provides the data for the elements in the identified content records 255 to the user device, and a browser and/or a mobile application on the user device populates the advertisement template that is part of a publisher web page and/or part of the publisher mobile application to render the feed-based advertisement on the user device using the data for the elements.

Figure 3:
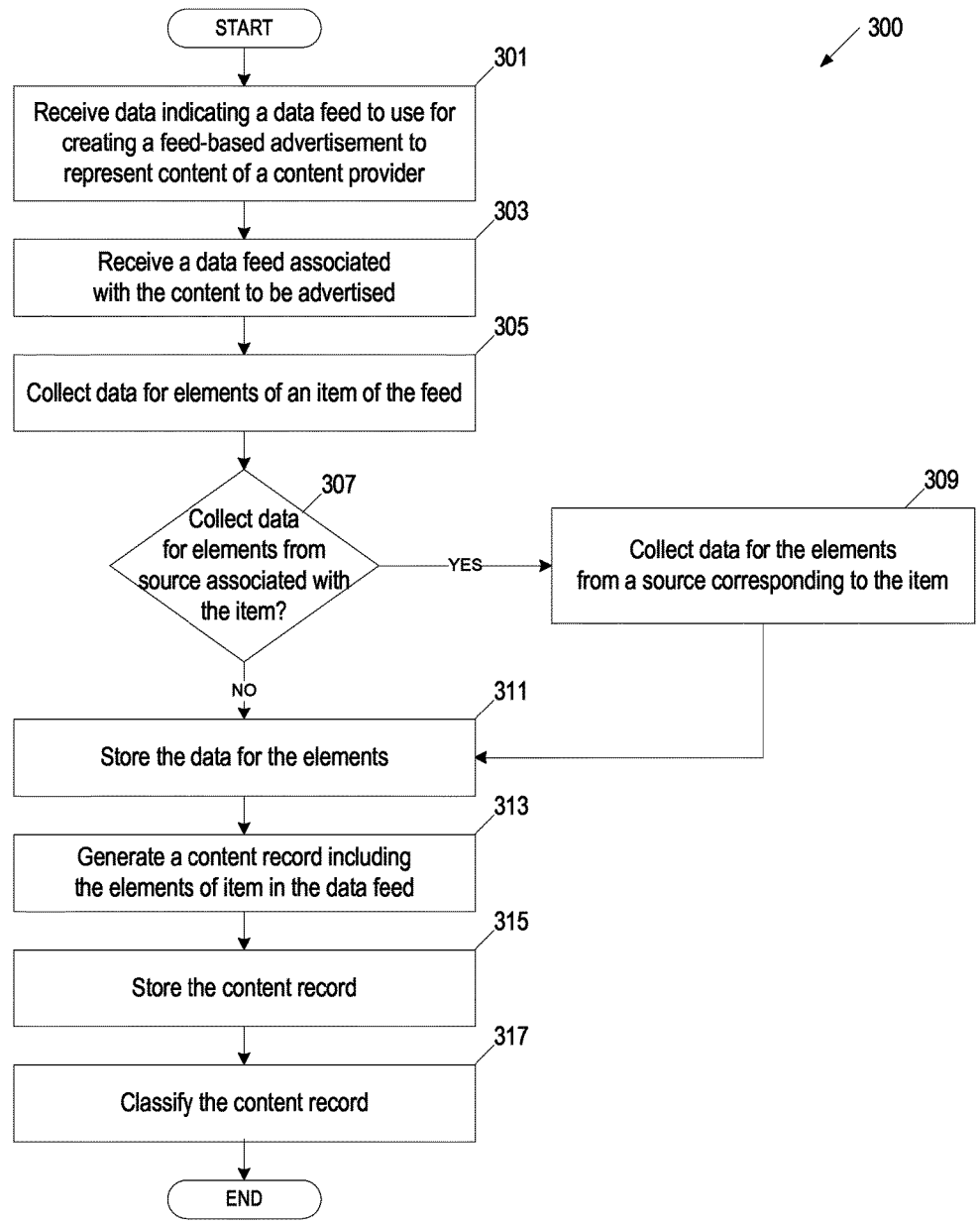
FIG. 3 is a flow diagram of an implementation of a method for collecting data for creating feed-based advertisements.

FIG. 3 is a flow diagram of an implementation for a method 300 for collecting data for creating the feed-based advertisement. The method 300 may be performed by processing logic that may comprise hardware (circuitry, dedicated logic, etc.), software (such as is run on a general purpose computer system or a dedicated machine), or a combination of both. In some implementations, the method 300 is performed by a feed-based advertisement module (e.g., a feed-based advertisement module 150 running on a third party service provider machine 120 of FIG. 1).

At block 301, the feed-based advertisement module receives data (e.g., registration data) indicating which one or more data feeds to use for creating feed-based advertisements. The data can be received, for example, when a content provider (e.g., advertiser) subscribes to a third party advertising service. The data can include a feed identifier (e.g., URL) of the feed and/or an item identifier of an item in the feed that should be used to create the feed-based advertisement.

In one implementation, the data (e.g., registration data) may include keywords that are associated with the content that is to be advertised and the feed-based advertisement module can use the keywords and a mapping algorithm to determine which feed and/or item in the feed should be used to create the feed-based advertisement. For example, the data may include keywords, such as, sports, golf, major, tournament, par, player, birdie, club, iron, wood, green, fairway, etc. The feed-based advertisement module may use these keywords and the mapping algorithm to recommend a data feed that can be used to create the feed-based advertisement.

At block 303, the feed-based advertisement module receives the data feed associated with the content to be advertised. For example, the feed-based advertisement module can establish communication with the feed server of the data feed and subscribe to the data feed. The feed-based advertisement module can store data from the received data feed in a data store. The data feed can be obtained using a push or pull method.

At block 305, the feed-based advertisement module collects data from the data feed. The feed-based advertisement module can parse the data feed to identify an item and to identify elements of the item, and can extract the data pertaining to the elements. Examples of the elements of the item can include, and are not limited to, a title element, a link element, a description element, a body text element, URL, a keywords element, a media (e.g., image, audio, video) file element, a publish date element, an author element, a category element, a comments element, an identifier element, a source element, etc.

At block 307, the feed-based advertisement module determines whether to collect data for elements of an item from the data source (e.g., web page) that is associated with the item. If a data feed has data for the elements of the item (block 307), the feed-based advertisement module stores the data for the elements at block 311. If a data feed does not have data for one or more elements of the item (block 307), the feed-based advertisement module collects the data for the elements from the data source (e.g., web page) that corresponds to the item at block 309. The feed-based advertisement module can use a hyperlink, which corresponds to the link element for the item in the data feed, to obtain the data for an element in the data source.

For example, in the case of a golf news article, the advertiser, Golfing Magazine, Inc. may omit the full body text from the data feed and instead, may include a brief synopsis of the article or the first paragraph of the article in the data feed. The data feed for "http://www.golfingmagazine.com/rss.xml" may not include a body text element for the item, and the feed-based advertisement module may use the hyperlink in the link element in the data feed to obtain data (e.g., full body text) for the body text element from the underlying web page (e.g., www.golfingmagazine.com) of the item. The feed-based advertisement module may retrieve data for an element from a data source (e.g., www.golfingmagazine.com) using a web crawler or web spider capable of scraping and/or extracting content from a URL. The feed-based advertisement module can use any suitable protocol, such as X-path, for a scraping operation.

At block 311, the feed-based advertisement module stores the data for the elements for the item in the data store. At block 313, the feed-based advertisement module generates a content record, which can include the data for the elements, for the data feed item and stores the content record in the data store at block 315. Examples of a content record can include, and are not limited to, a record in a file system, a record in a database, a text file, a database entry, etc. In one implementation, the content record is an XML-formatted plain text file. Each content record can be created, for example, by copying data for the elements of a corresponding item to a text file and storing the text file in the data store. The XML field elements of the content record can be mapped to the same field elements present in the item in the data feed. For example, the title, body text, and link (e.g., URL) fields of the content record may be copied from the corresponding element fields of the item in the data feed.

At block 317, the feed-based advertisement module classifies the content record. Classification can include associating one or more categories, one or more keywords, etc. with the content record. For example, the feed-based advertisement module may classify a content record for Golfing Magazine, Inc. as golf, course, club, iron, and tournament. The feed-based advertisement module can use machine learning and/or a classification model to classify the content record.

Method 300 or portions of method 300 can be iterative. The number of iterations can be based on the number of times the same data feed or a different data feed is received. For example, an updated version of a data feed, which may include a new item, can be received at block 303, after receiving a previous version of the data feed. The feed-based advertisement module can identify a new item in the updated data feed that was not present in the previous data feed and can collect data, in the updated data feed, for elements of the new item at block 305. The feed-based advertisement module may collect data for elements from the source (e.g., web page) of the new item at block 309. At block 311, the feed-based advertisement module can store the data and can generate a content record for the new item at block 313. The content record can include the data for the elements of the new item.

Figure 4:
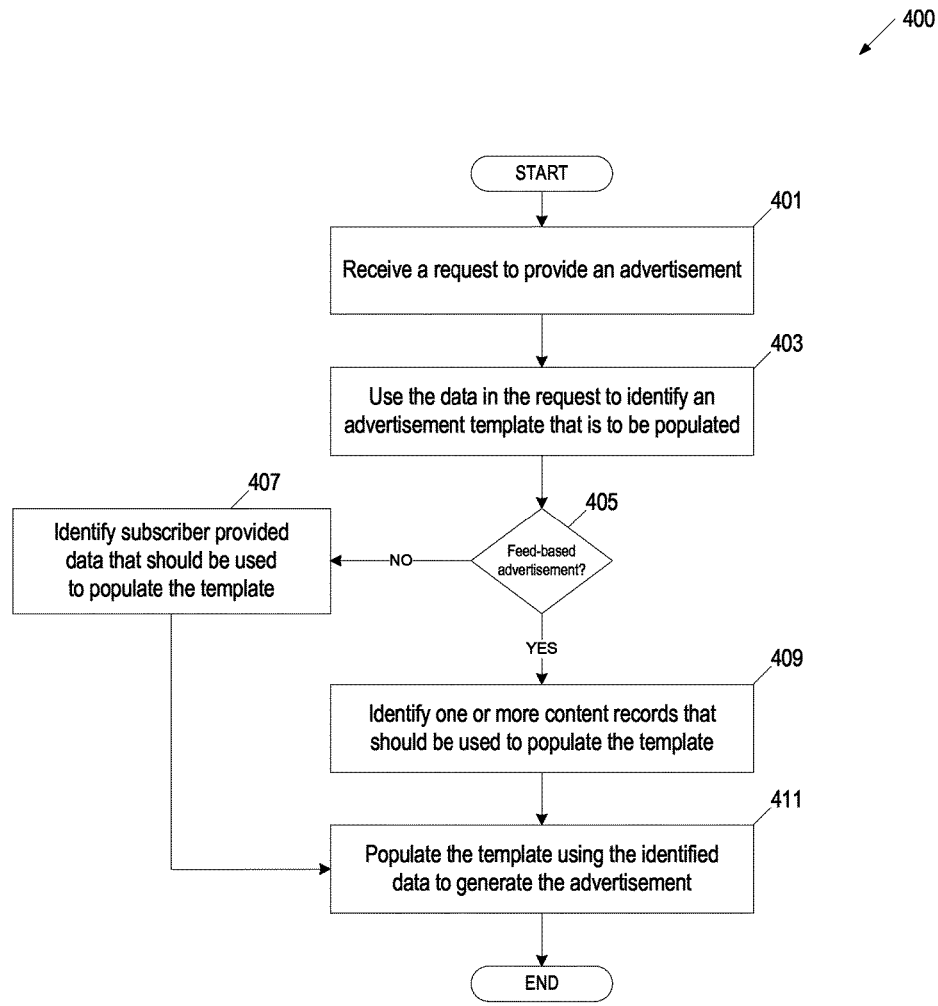
FIG. 4 is a flow diagram of an implementation of a method for providing feed-based advertisements using a data feed.

FIG. 4 is a flow diagram of an implementation for a method 400 for providing advertisements, including feed-based advertisements. The method 400 may be performed by processing logic that may comprise hardware (circuitry, dedicated logic, etc.), software (such as is run on a general purpose computer system or a dedicated machine), or a combination of both. In some implementations, the method 400 is performed by a feed-based advertisement module (e.g., feed-based advertisement module 150 running on third party service provider machine 120 of FIG. 1).

At block 401, the feed-based advertisement module receives a request for an advertisement. The request can be received from a browser and/or a mobile application on a user device. A request can be triggered by, for example, and not limited to, a web page view, a web page load, a mobile application data load, etc. For example, when a user accesses a pre-configured publisher web site, such as www.sportsnewsjournal.com, the web page load of the www.sportsnewsjournal.com web page may trigger a request for an advertisement to be sent to the feed-based advertisement module.

Publisher web pages, publisher mobile applications, publisher messages (e.g., email, text, social media messages, etc.), and/or publisher newsletters can be pre-configured to send requests for advertisements to the feed-based advertisement module. For example, the publisher Sports News Journal may receive instruction data and an advertisement template from the feed-based advertisement module and may include the instruction data and the advertisement template in web pages for the website www.sportsnewsjournal.com and/or in a Sports News Journal mobile application. The instruction data can cause a browser and/or a publisher mobile application to request advertisements, including feed-based advertisements, from the feed-based advertisement module.

The request can include, for example, and not limited to, a publisher identifier and a format type identifier. A format type identifier can be an indicator of the type of format (e.g., website format, mobile application format, etc.) that should be used for the advertisement. At block 403, the feed-based advertisement module can use the publisher identifier and the format identifier to identify which advertisement template should be populated to provide the advertisement. For example, the format type identifier may be "website" and the publisher identifier may be "Sports News Journal."

For example, a user may request a page view of www.sportsnewsjournal.com on a user device. The browser on the user device may receive a web page for www.sportsnewsjournal.com from a web application server. The www.sportsnewsjournal.com web page may have instructions and an advertisement template. When the browser loads the web page, the instructions can cause the browser to request an advertisement (e.g., feed-based advertisement) from the feed-based advertisement module. At block 401, the feed-based advertisement module receives the request and uses the data (e.g., publisher identifier, format identifier) to identify that the Sports News Journal advertisement template is to be populated at block 403.

At block 405, the feed-based advertisement module determines whether the request is for a feed-based advertisement or a non-feed-based advertisement. The request can include data indicating whether the request is for a feed-based advertisement or a non-feed-based advertisement. If the request is not for a feed-based advertisement, the feed-based advertisement module identifies data provided by the advertiser (e.g., subscriber) that should be used to populate the advertisement template at block 407. For example, the advertiser may provide specific content for the advertisement. The advertiser-provided data may be stored in a data store. In one implementation, the feed-based advertisement module performs a mapping algorithm using the data in the request and/or user data (e.g., user preferences, user browser history, user application usage data, gender, age, geographic location, etc.) to identify which advertiser-provided data in the data store to use. For example, the mapping algorithm may determine that the data provided by the advertiser Golfing Magazine, Inc. should be used for the Sports News Journal advertisement template.

If the request is for a feed-based advertisement (block 405), the feed-based advertisement module identifies one or more content records that should be used to populate the advertisement template at block 409. The feed-based advertisement module can use a mapping algorithm, data (e.g., publisher identifier, format identifier) in the request, the advertisement template, the classifications of the content records, and/or user data (e.g., user preferences, user browser history, user application usage data, gender, age, geographic location, etc.) to identify the content records that should be used to populate the advertisement template. For example, the mapping algorithm may determine that one or more content records for Golfing Magazine, Inc. should be used for the Sports News Journal advertisement template.

In one implementation, at block 411, the feed-based advertisement module populates the advertisement template using the identified data (e.g., advertiser-provided data, content record data) to generate the advertisement and sends the advertisement to the user device. A browser and/or mobile application can present the advertisement on the user device. For example, the feed-based advertisement module may populate the Sports News Journal advertisement template with the data for the title element and the link element in the content record for an item in a Golfing Magazine, Inc.

data feed to generate the feed-based advertisement and may send the feed-based advertisement to a browser on the user device. The browser can load a requested web page (e.g., www.sportsnewsjournal.com) with the received feed-based advertisement. The user may select (e.g., click) the feed-based advertisement for www.golfingmagazine.com in the www.sportsnewsjournal.com website and be directed to the digital content that is associated with the feed-based advertisement. For example, the user may be redirected to the www.golfingmagazine.com website.

In another implementation, at block 411, the feed-based advertisement module provides the data (e.g., advertiser-provided data, content record data) to a browser and/or a mobile application on the user device, and the browser and/or mobile application renders the advertisement on the user device using the data.

Figure 5:
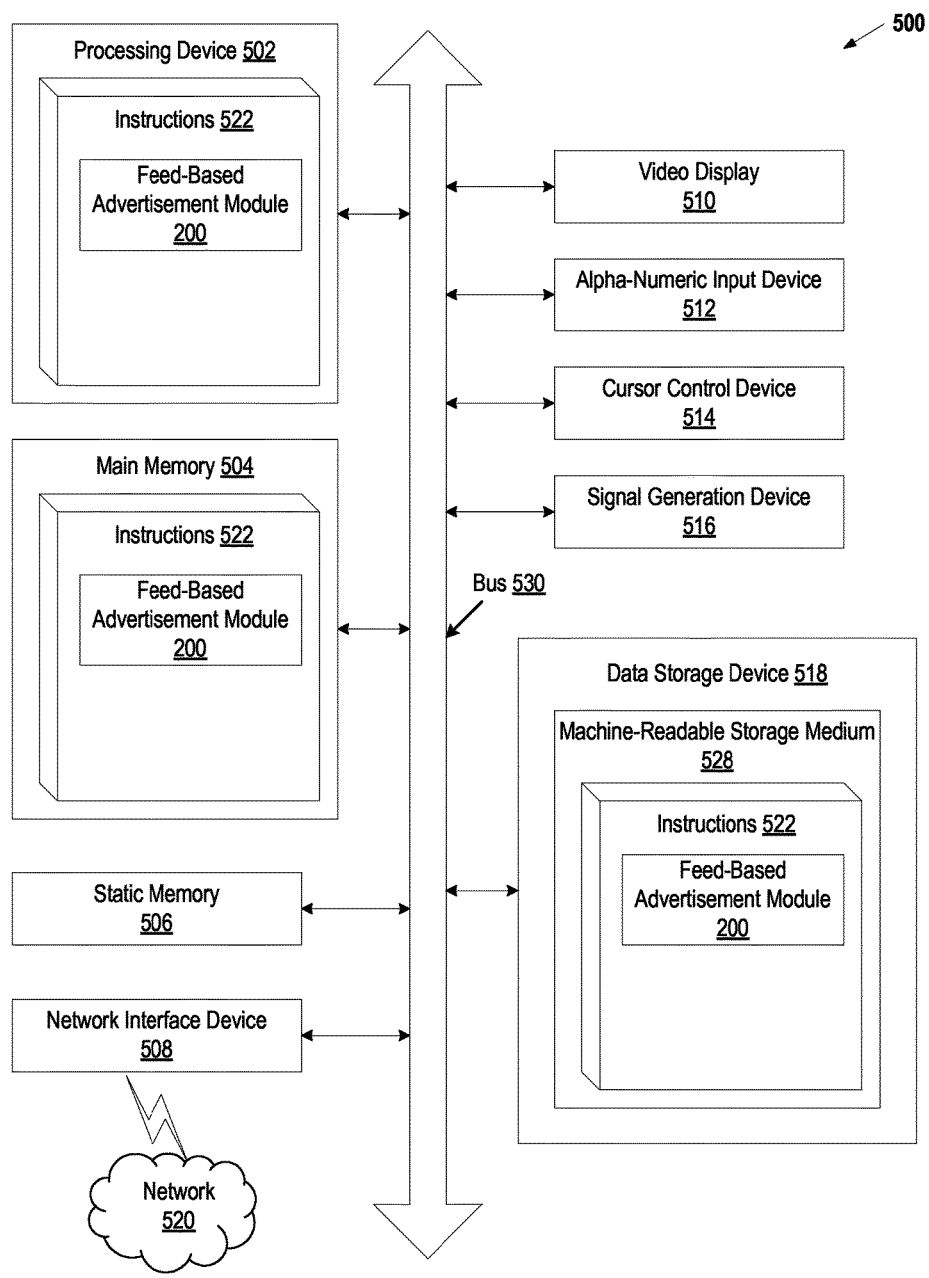
FIG. 5 is a block diagram illustrating an example computing device, in accordance with some implementations.

FIG. 5 is a block diagram illustrating an example computing device 500. In one implementation, the computing device corresponds to the third party server provider machine 120 hosting the feed-based advertisement module 150 of FIG. 1 (e.g., feed-based advertisement module 200 in FIG. 2). The computing device 500 includes a set of instructions for causing the machine to perform any one or more of the methodologies discussed herein. In alternative implementations, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processing system (processing device) 502, a main memory 504 (e.g., read-only memory (ROM), flash memory, dynamic random access memory (DRAM) such as synchronous DRAM (SDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 502 may also be one or more special-purpose processing devices such as an application specific integrated circuit (ASIC), a field programmable gate array (FPGA), a digital signal processor (DSP), network processor, or the like. In one implementation, the processing device 502 is configured to execute the feed-based advertisement module 200 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-readable storage medium 528 (computer readable storage medium) on which is stored one or more sets of instructions (e.g., instructions of feed-based advertisement module 200) embodying any one or more of the methodologies or functions described herein. The feed-based advertisement module 200 may also reside, completely or at least partially, within the main memory 504 and/or within the processing device 502 during execution thereof by the computer system 500, the main memory 504 and the processing device 502 also constituting computer-readable media. The feed-based advertisement module 200 may further be transmitted or received over a network 520 via the network interface device 508.

While the computer-readable storage medium 528 is shown in an example implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

In the above description, numerous details are set forth. It will be apparent, however, to one of ordinary skill in the art having the benefit of this disclosure, that implementations of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "generating," "providing," "collecting," "classifying," "creating," "adding," "sending," "determining," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage devices.

Implementations of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions.

Implementations of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other implementations will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   storing an association between a first type of content item and a set of data elements comprising a first data element type and a second data element type;
   identifying, by a processing device, a data feed distributed to one or more subscriber systems by an advertiser system, the data feed to be used to generate a feed-based advertisement to represent content that is to be advertised to one or more non-subscriber systems, wherein the data feed comprises a content item of the first type;
   parsing the content item to identify a first set of data elements associated with the content item;
   extracting from the first set of data elements parsed from the content item, by the processing device, a first data element corresponding to the first data element type;
   identifying, based on a comparison of the set of data elements and the first set of data elements parsed from the content item by the processing device, that the data feed does not include a second data element corresponding to the second data element type;
   retrieving, by the processing device, the second data element using a universal resource locator (URL) corresponding to a web-based source system associated with the advertiser system;
   generating, based on the data feed, a first data record comprising the first data element extracted from the data feed and the second data element retrieved from the web-based source system;
   collecting, by the processing device, registration data from a publisher system, wherein the registration data comprises information identifying a set of advertisement data elements selected for inclusion in a first feed-based advertisement to be displayed via a website of the publisher system;
   extracting, from the registration data, the information identifying the set of advertisement data elements;
   generating, using the information identifying the set of advertisement data elements extracted from the registration data, a first template identifying the set of advertisement data elements to include in the first feed-based advertisement to be displayed via the website of the publisher system;
   transmitting instruction data and the first template to the publisher system, wherein the publisher system executes the instruction data in response to a user accessing a first webpage of the publisher system to generate a request to render a feed-based advertisement in accordance with the first template on a webpage of the publisher system;
   in response to receipt of the request for the feed-based advertisement, identifying the first template to be populated to generate the first feed-based advertisement;
   selecting, using a mapping algorithm, the first data record to be used to populate the first template;
   generating, by the processing device, the first feed-based advertisement by populating the set of advertisement data elements of the first template with the first data element and the second data element stored in the first data record; and
   causing, by the processing device, a display of the first feed-based advertisement via the webpage of the publisher system to one or more non-subscriber systems.

2. The method of claim 1, wherein the first set of data elements of the first data record comprises at least one of a title, an image, or a location identifier of a data source that is associated with the first set of data elements.

3. The method of claim 1, further comprising:
   classifying the first data record; and
   creating, using a classification of the first data record, mapping data to associate the content record with the publisher system.

4. The method of claim 1, further comprising:
   sending an electronic message comprising data pertaining to the first feed-based advertisement to a user device, the electronic message comprising at least one of an electronic mail message, a short message service (SMS) text message, a multimedia messaging service (MMS) text message, an instant message, or a social networking message.

5. The method of claim 1, wherein the data feed is at least one of a Really Simple Syndication (RSS) feed, an atom feed, an Extensible Markup Language (XML)-based feed, or a JavaScript Object Notation (JSON) feed.

6. A system comprising:
   a memory; and
   a processing device operatively coupled to the memory, the processing device configured to:
      store an association between a first type of content item and a set of data elements comprising a first data element type and a second data element type;
      identify a data feed distributed to one or more subscriber systems by an advertiser system, the data feed to be used to generate a feed-based advertisement to represent content that is to be advertised to one or more non-subscriber systems, wherein the data feed comprises a content item of the first type;
      parse the content item to identify a first set of data elements associated with the content item;

extract, from the first set of data elements parsed from the content item, a first data element corresponding to the first data element type;

identify, based on a comparison of the set of data elements and the first set of data elements parsed from the content item, that the data feed does not include a second data element corresponding to the second data element type;

retrieve the second data element using a universal resource locator (URL) corresponding to a web-based source system associated with the advertiser system;

generate, based on the data feed, a first data record comprising the first data element extracted from the data feed and the second data element retrieved from the web-based source system;

collect registration data from a publisher system, wherein the registration data comprises information identifying a set of advertisement data elements selected for inclusion in a first feed-based advertisement to be displayed via a website of the publisher system extract, from the registration data, the information identifying the set of data elements;

generate using the information identifying the set of advertisement data elements extracted from the registration data, a first template identifying the set of advertisement data elements to include in the first feed-based advertisement to be displayed via the website of the publisher system;

in response to receipt of the request for the feed-based advertisement, identify the first template to be populated to generate the first feed-based advertisement;

identify the first data record to be used to populate the first template;

generate the first feed-based advertisement by populating the set of data elements of the first template with the first set of elements and the second data element stored in the first data record; and cause a display of the first feed-based advertisement via the webpage of the publisher system to one or more non-subscriber systems.

7. The system of claim 6, the processing device to:

send an electronic message comprising data pertaining to the first feed-based advertisement to a user device, wherein the electronic message comprising at least one of an electronic mail message, a SMS (short message service) text message, a MMS (multimedia messaging service) text message, an instant message, or a social networking message.

8. The system of claim 6, the processing device to:

receive a second data feed that is associated with the content to be advertised, the second data feed comprising second information relating to one or more of the data elements; and generate the first feed-based advertisement using the second information.

9. A non-transitory computer-readable storage medium comprising executable instructions, the instructions being executed by a processing device to:

store an association between a first type of content item and a set of data elements comprising a first data element type and a second data element type;

identify a data feed distributed to one or more subscriber systems by an advertiser system, the data feed to be used to generate a feed-based advertisement to represent content that is to be advertised to one or more non-subscriber systems, wherein the data feed comprises a content item of the first type;

parse the content item to identify a first set of data elements associated with the content item;

extract, from the first set of data elements parsed from the content item, a first data element corresponding to the first data element type;

identify, based on a comparison of the set of data elements and the first set of data elements parsed from the content item, that the data feed does not include a second data element corresponding to the second data element type;

retrieve the second data element using a universal resource locator (URL) corresponding to a web-based source system associated with the advertiser system;

generate, based on the data feed, a first data record comprising the first data element extracted from the data feed and the second data element retrieved from the web-based source system;

collect registration data from a publisher system, wherein the registration data comprises information identifying a set of advertisement data elements selected for inclusion in a first feed-based advertisement to be displayed via a website of the publisher system extract, from the registration data, the information identifying the set of data elements;

generate using the information identifying the set of advertisement data elements extracted from the registration data, a first template identifying the set of advertisement data elements to include in the first feed-based advertisement to be displayed via the website of the publisher system;

in response to receipt of the request for the feed-based advertisement, identify the first template to be populated to generate the first feed-based advertisement;

identify the first data record to be used to populate the first template;

generate the first feed-based advertisement by populating the set of data elements of the first template with the first set of elements and the second data element stored in the first data record; and cause a display of the first feed-based advertisement via the webpage of the publisher system to one or more non-subscriber systems.

10. The non-transitory computer readable storage medium of claim 9, the processing device to:

send an electronic message comprising data pertaining to the first feed-based advertisement to a user device, wherein the electronic message comprising at least one of an electronic mail message, a SMS (short message service) text message, a MMS (multimedia messaging service) text message, an instant message, or a social networking message.

11. The non-transitory computer readable storage medium of claim 9, the processing device to:

receive a second data feed that is associated with the content to be advertised, the second data feed comprising second information relating to one or more of the data elements; and generate the first feed-based advertisement using at least a portion of the second information.

* * * * *